(12) United States Patent
Halderman

(10) Patent No.: US 6,231,229 B1
(45) Date of Patent: May 15, 2001

(54) INSTRUMENT AND METHOD TO MEASURE THE DURATION OF EXPOSURE TO TEMPERATURE BY DETERMINING THE AMOUNT OF AN INDICATOR MATERIAL

(75) Inventor: Jonathan D. Halderman, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/579,267

(22) Filed: May 26, 2000

(51) Int. Cl.[7] .............................. G01K 1/00; G01N 25/04; G01N 25/28
(52) U.S. Cl. ............................................. 374/45; 116/217
(58) Field of Search .................... 374/102, 160; 368/327; 116/216, 217, 218

(56) References Cited

U.S. PATENT DOCUMENTS

| | | | |
|---|---|---|---|
| 2,854,384 | * | 9/1958 | Beakley et al. . |
| 3,045,472 | * | 7/1962 | Paulik et al. . |
| 4,016,762 | * | 4/1977 | Payne ........................ 73/358 |
| 4,038,936 | * | 8/1977 | Kessler ..................... 116/114.5 |
| 4,229,976 | | 10/1980 | Jones ........................ 73/371 |
| 4,311,793 | * | 1/1982 | Halleck ..................... 435/31 |
| 4,370,862 | * | 2/1983 | Brister ...................... 62/66 |
| 4,404,922 | * | 9/1983 | Morane et al. ............ 116/206 |
| 4,550,676 | * | 11/1985 | Francis ..................... 116/206 |
| 4,561,300 | * | 12/1985 | O'Brien .................... 73/154 |
| 4,738,549 | * | 4/1988 | Plimpton .................. 374/208 |
| 5,215,378 | * | 6/1993 | Manske ..................... 374/105 |
| 5,718,633 | * | 2/1998 | Gehrke ..................... 464/23 |
| 5,779,363 | | 7/1998 | Freire et al. .............. 374/33 |
| 5,821,502 | * | 10/1998 | Lukins et al. ............ 219/496 |

* cited by examiner

Primary Examiner—G. Bradley Bennett
Assistant Examiner—Gail Verbitsky

(57) ABSTRACT

An instrument and method for accurately measuring and displaying the length of time that the instrument spends at temperatures between a predetermined first temperature and a predetermined second temperature. The instrument includes a capillary tube, a plug and an indicator material that is liquid at temperatures below the predetermined second temperature and quickly solidifies at temperature equal to or above the predetermined second temperature. The plug melts at a temperature equal to the predetermined first temperature to allow the indicator material to move by capillary action into and through the capillary tube. When the indicator material reaches the predetermined second temperature, it solidifies. The amount of indicator material that moves into the capillary tube between the time at which the instrument reaches the predetermined first temperature at the time at which it attains the predetermined second temperature is proportional to the amount of time that the instrument spends at temperatures intermediate between the predetermined first and second temperatures. The method according to the present invention employs an instrument according to the present invention to measure the amount of time that the instrument spends between a predetermined first and second temperatures. The instrument and method may be used in the manufacture of integrated circuits, for instance in determining how much time an integrated circuit package spends between an equilibration temperature and a reflow temperature.

18 Claims, 5 Drawing Sheets

20

INSTRUMENT AND METHOD TO MEASURE THE DURATION OF EXPOSURE TO TEMPERATURE BY DETERMINING THE AMOUNT OF AN INDICATOR MATERIAL

BACKGROUND OF THE INVENTION

1. Field of the Invention

The present invention relates to an instrument and a method for determining duration at temperatures between a predetermined first temperature and a predetermined second temperature. Instruments and methods according to the present invention are useful, for instance, in the art of semiconductor packaging.

2. Description of Related Art

Interconnection and packaging related issues are among the main factors that determine not only the number of circuits that can be integrated on a chip, but also the performance of the chip. These issues have increased in importance as advances in chip design have led to reductions in the sizes of features on transistors and enlargements in chip dimensions. Industry has come to realize that merely having a fast chip will not result in a fast system; it must also be supported by equally fast and reliable packaging.

Essentially, packaging supplies the chip with signals and power, and performs other functions such as heat removal, physical support and protection from the environment. Another important function of the package is simply to redistribute the tightly packed I/Os off the chip to the I/Os of a printed wiring board.

An example of a package-chip system is the "flip-chip" integrated circuit mounted on a package substrate such as an area array organic package. Flip-chip mounting entails placing solder bumps on a die or chip, flipping the chip over, aligning the chip with the contact pads on a package substrate, and reflowing the solder balls in a furnace to establish bonding between the chip and the substrate. This method is advantageous in certain applications because the contact pads are distributed over the entire chip surface rather than being confined to the periphery as in wire bonding and most tape-automated bonding (TAB) techniques. As a result, the maximum number of I/O and power/ground terminals available can be increased, and signal and power/ground interconnections can be more efficiently routed on the chips. With flip-chip packaging, proper heating of the chip and the package is essential to ensure proper operation of the final assembly.

It is known in the prior art to combine multiple integrated circuit components on the same package. This is accomplished by placing plural integrated circuit components, such as bumped dice or chips off a single package substrate. The package is then heated in an oven where the solder bumps on the dice melt, creating an electrically conductive connection between the package and the dice.

The foregoing method has a disadvantage in that different integrated circuit components have widely varying heat capacities and heat coefficients. This means that some components reach reflow temperatures more quickly than others under the same heating conditions. If the oven temperature is set too low, some components will not reach reflow temperatures, and bonding will not occur between those components and the package substrate. On the other hand, if the oven temperature is set too high, some components will be heated to temperatures above the reflow temperature for too long a time, and thermally sensitive components, especially small components, will be damaged.

Accordingly, it is known in the prior art to use reflowing ovens having heating zones. In the prior art methods, the package and die or chip are placed on a boat, which is located on a conveyor. The conveyor carries the boat and the integrated circuit through the reflow oven. The oven has two or more zones which are held at different temperatures. In typical zone heating ovens, one zone is at a temperature, called a soak temperature, slightly below a solder reflow temperature, whereas a subsequent zone is held at a temperature slightly higher than a solder reflow temperature. Zone heating ovens allow the integrated circuit packages and dice or chips to reach temperatures somewhat below solder reflow temperatures, hereinafter soak temperature, before finally being heated to temperatures higher than solder reflow temperatures. A soak temperature is generally chosen to minimize the difference in time that each component must spend at temperatures greater than solder reflow temperatures to achieve bonding. This results in a reduction in the amount of thermal stress on all components, and in particular on temperature- sensitive components. Therefor, using a zone heating oven, it is possible to achieve complete bonding of all the integrated circuit components to the integrated circuit package substrate without the problem of overheating small and sensitive components.

While prior art methods allow for the various integrated circuit components to reach an intermediate temperature, such as a soak temperature, before heating them to a solder reflow temperature, prior art methods do not provide an instrument or method for accurately determining the length of time that an integrated circuit assembly spends at intermediate temperatures, such as soak temperatures. Information relating to duration of temperature at temperatures intermediate between a predetermined first and second temperature is increasingly desirable for optimal operation of reflow ovens, such as zone heating reflow ovens, because small and sensitive integrated circuit components are often sensitive to overlong exposure to even relatively low soak temperatures, which are below typical solder reflow temperatures. Moreover, information relating to duration at intermediate temperatures will vary with the particular number and type of components to be bonded to a package substrate, the size and composition of the package substrate, the age and condition of the reflow oven, etc. Furthermore, indicated reflow oven temperatures do not necessarily reflect accurately the actual temperature in the vicinity of an integrated circuit package assembly as it passes through each zone of the oven. Localized heat sinks (such as conveyors, boats, and other integrated circuit components), uneven heating by the oven's heating elements, and unequal dwell times in zones of an oven can cause variations in duration of heating at intermediate temperatures from one production run to another. Thus, the amount of time that an integrated circuit package assembly spends at a temperature intermediate between first and second predetermined temperatures is desirably determined empirically, and advantageously will be determined regularly, to ensure uniformity between production runs. However, the prior art does not provide a method for empirically, precisely and accurately determining the amount of time that an integrated circuit package assembly spends at a temperature intermediate between first and second predetermined temperatures. It thus remains a problem in the prior art that integrated circuit package assemblies may be held at temperatures above a first predetermined temperature longer than is optimal.

There thus remains a need in the art for a method and an instrument for accurately measuring and displaying the amount of time that an integrated circuit package spends at temperatures between a predetermined first temperature and a predetermined second temperature that is higher than the predetermined first temperature.

SUMMARY OF THE INVENTION

The present invention satisfies the need in the art for an instrument and a method for conveniently and accurately measuring and displaying the amount of time that an article, such as an integrated circuit package, spends at temperatures between a predetermined first temperature, such as a soak temperature, and a predetermined second temperature, such as a solder reflow temperature, that is higher than the first temperature.

An instrument according to the present invention comprises a capillary tube, an indicator material that is originally outside the capillary tube, and a plug within the capillary tube. The indicator material is liquid at temperatures below the second predetermined temperature. The plug prevents the indicator material from entering the capillary tube until the instrument reaches the first predetermined temperature. At the first predetermined temperature, the plug melts and permits the indicator material to enter into the capillary tube through an opening therein. The indicator material moves via capillary action into the capillary tube in a time-dependent manner until the instrument reaches the second predetermined temperature, at which point the indicator material quickly solidifies. By knowing the relationship between the amount of indicator material in the capillary tube at the time when it reaches the second predetermined temperature, and the time that the indicator material takes to move via capillary action through the capillary tube, the time duration of the instrument at temperatures intermediate between the first predetermined temperature and the second predetermined temperature is then determined.

A method according to the present invention uses the instrument according to the present invention to determine the time duration of the instrument at temperatures intermediate between the first predetermined temperature and the second predetermined temperature. The method according to the present invention comprises heating an instrument according to the present invention, suitably in the presence of an article to be heated, such as an integrated circuit package assembly, in a heating device, such as a reflow oven, cooling the instrument according to the present invention, measuring the amount of indicator material in the capillary tube, and determining from the amount of indicator material in the capillary tube the time duration of the instrument at temperatures intermediate between the first predetermined temperature and the second predetermined temperature.

An instrument and a method according to the present invention permit one to accurately and conveniently determine the amount of time an integrated circuit package assembly spends at temperatures intermediate between a first predetermined temperature and a second predetermined temperature. Such information is important for optimizing the conditions under which integrated circuit package assemblies are heated in a reflow oven to achieve bonding between integrated circuit components and package substrates. Thus, an instrument and method according to the present invention provide valuable information for improving the quality of integrated circuit package manufacturing that is not available in the prior art.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

DETAILED DESCRIPTION OF THE INVENTION

Figure 1:
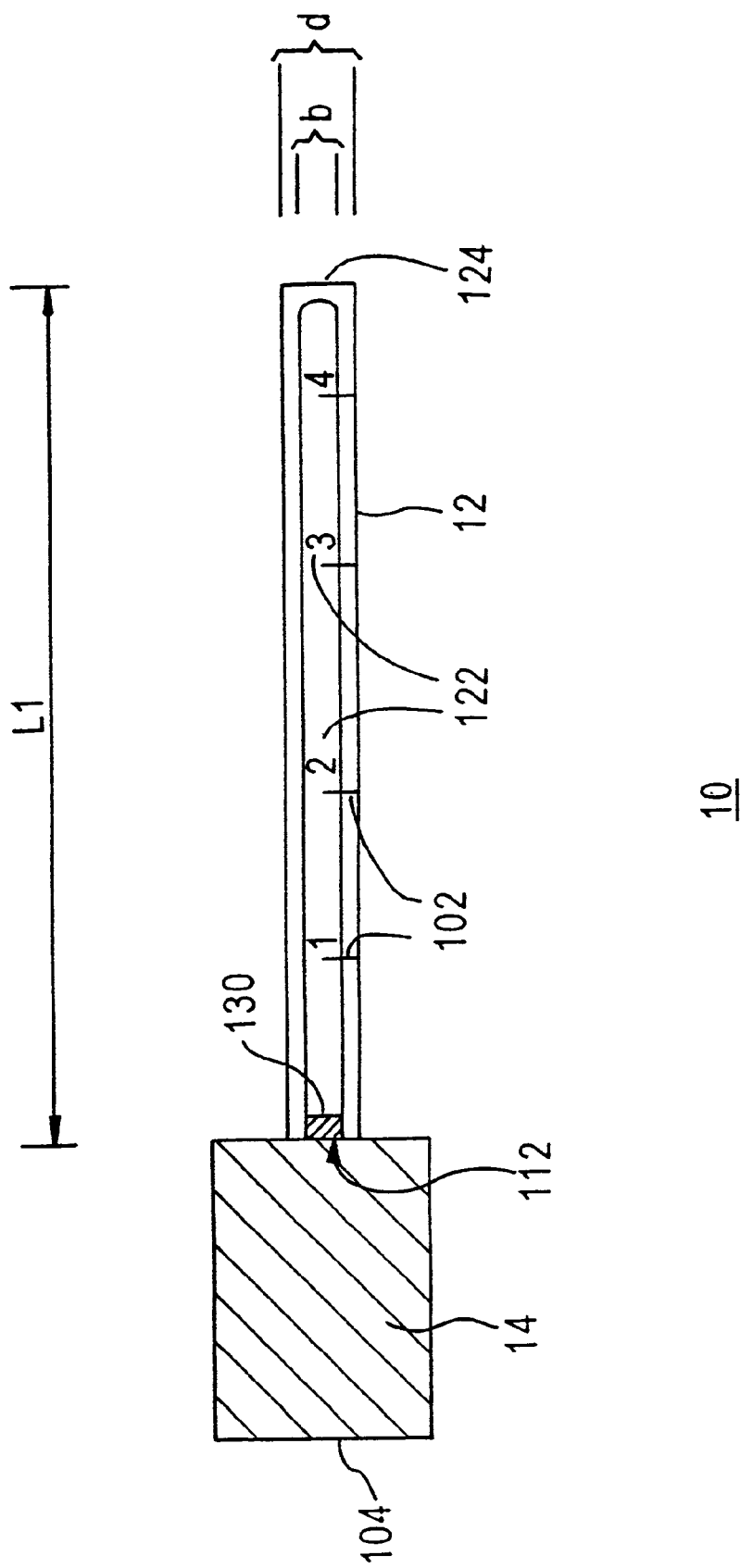
FIG. 1 is a side view of a an embodiment of a free standing instrument according to the present invention.

An instrument 10 according to the present invention is depicted in FIG. 1. The instrument comprises a capillary tube 12 having an opening 112, an end 124, graduated length indicia 102 and numerical length indicia 122. An indicator material 14 is outside of the capillary tube 12 and is in physical contact with the opening 112. The indicator material 14 is contained within a reservoir 104. A plug 130 is inside the capillary tube 12 and prevents the indicator material 14 from flowing into capillary tube 12. The indicator material 14 completely fills the reservoir 104, which is of sufficient volume that when the plug 130 melts by heating instrument 10 above a predetermined first temperature, the indicator material 14 moves by capillary action into and through the capillary tube 12 in a time-dependent fashion. The capillary tube 12 has an inner diameter (bore) b and an outer diameter d. The distance between the opening 112 of capillary tube 12 and the end 124 of capillary tube 12 is tube length L1.

Figure 2:
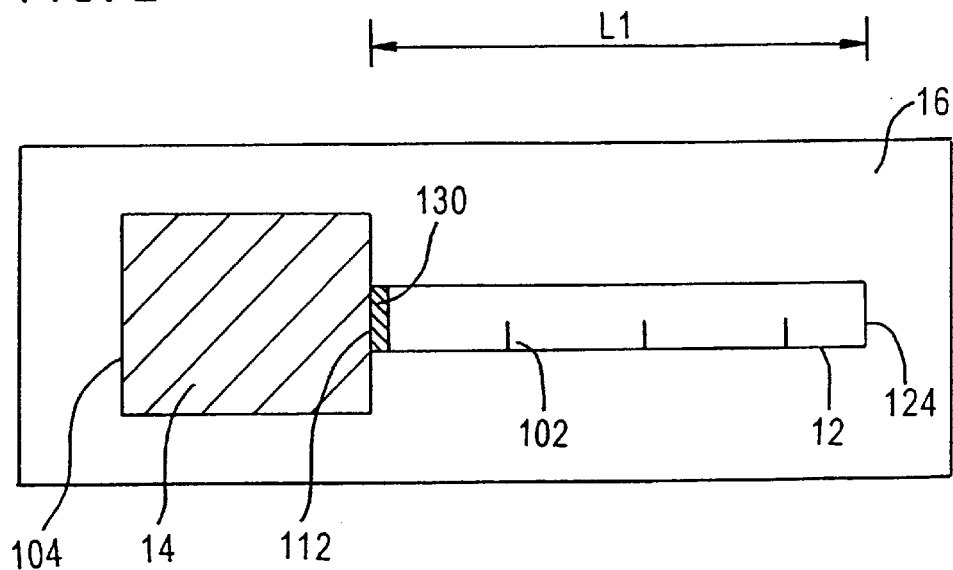
FIG. 2 is a cutaway side view of an embodiment of an instrument according to the present invention having a housing body.
Figure 3:
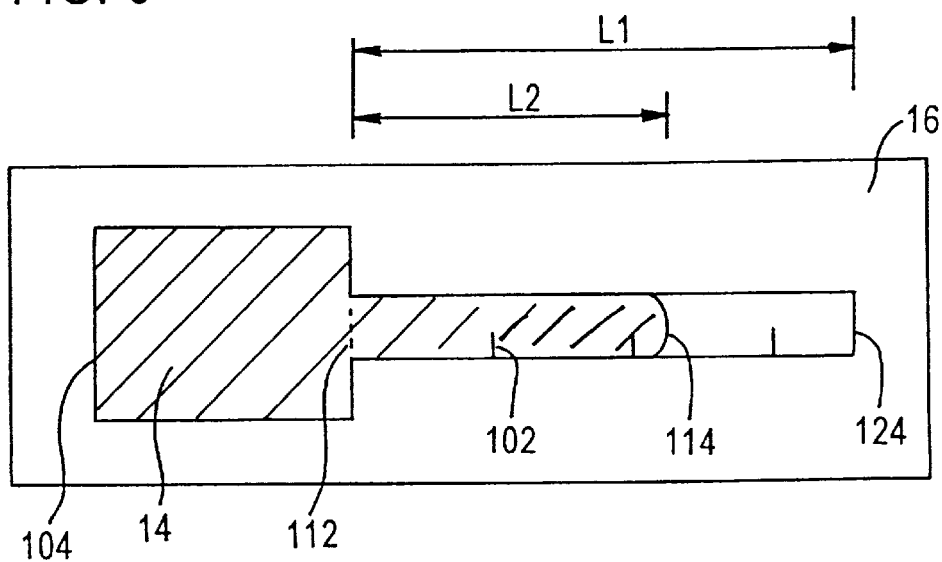
FIG. 3 is a cutaway side view of an embodiment of an instrument according to the present invention, having a housing body, after it has been heated to a temperature above a predetermined second temperature and then cooled to a temperature below a predetermined first temperature.
Figure 4:
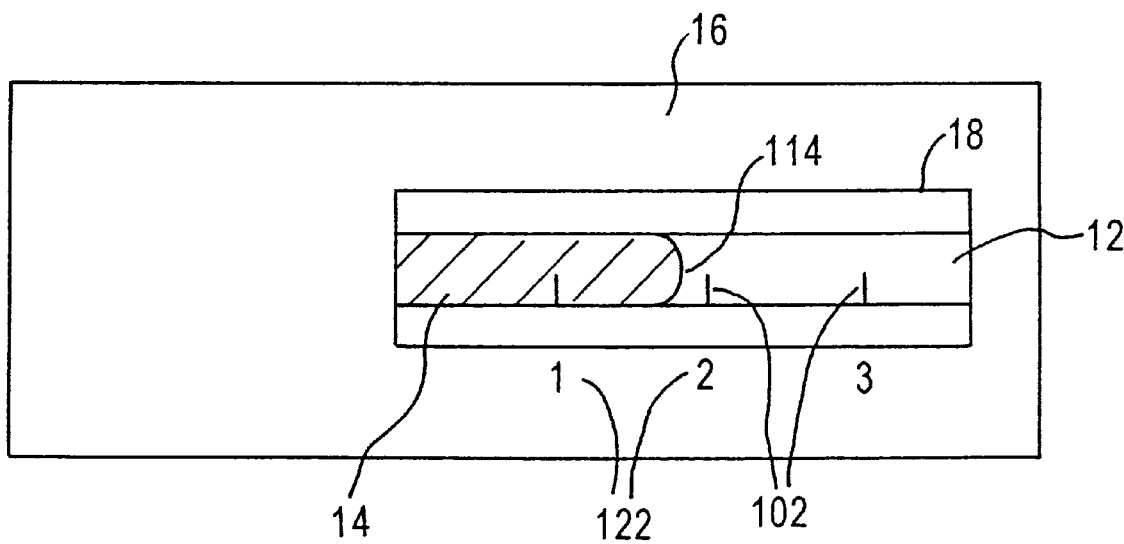
FIG. 4 is an elevational side view of the embodiment according to the present invention depicted in FIG. 3.

FIGS. 2–4 depict another embodiment according to the present invention.

FIG. 2 is a cutaway side view of an embodiment according to the present invention, which is instrument 20. In this exemplary embodiment, an instrument 20 according to the present invention comprises a housing body 16. Within the housing body 16 are: a capillary tube 12, a reservoir 104, a plug 130 and an indicator material 14. The capillary tube 12 has an opening 112, an end 124, and graduated length indicia 102. The indicator material 14 is outside of the capillary tube 12 and is in physical contact with the opening 112. The indicator material 14 is contained within a reservoir 104. The plug 130 is inside the capillary tube 12 and prevents the indicator material 14 from flowing into capillary tube 12. The indicator material 14 completely fills the reservoir 104, which is of sufficient volume that when the plug 130 melts by heating instrument 20 above a predetermined first temperature, the indicator material 14 moves by capillary action into and through the capillary tube 12 in a time-dependent manner. The capillary tube 12 has an inner diameter (bore) b and an outer diameter d. The distance between the opening 112 of capillary tube 12 and the end 124 of capillary tube 12 is tube length L1.

In a typical process employing the instrument 20, the instrument 20 is introduced into a heating apparatus, such as a reflow oven, and is heated. As the temperature rises, it first passes through the predetermined first temperature, such as a soak temperature as described above. In certain embodiments according to the present invention, the instrument 20 is held at the predetermined first temperature, such as a soak temperature, for several minutes so that the temperatures of the various integrated circuit components reach equilibrium. The plug 130 is made of a material such as wax or plastic that is solid and impervious to the indicator material 14 at temperatures below the first predetermined temperature, but that melts and becomes liquid at a temperature equal to the first predetermined temperature. Once the plug 130 melts at the temperature equal to the first predetermined temperature, the indicator material 14 is free to enter into the capillary tube 12 through opening 112, and to move through the capillary tube 12 via capillary action. The indicator material 14 moves at a time-dependent rate that is advantageously not temperature dependent, and is particularly advantageously linear with respect to time, although other time-dependent relationships are possible.

In certain embodiments according to the present invention, the capillary tube 12, indicator material 14, reservoir 104 and plug 130 are contained within a housing body 16. At room temperature, the indicator material 14 is held in reservoir 104 by plug 130. In operation, the instrument 20 is heated. For instance, as the instrument 20 reaches a predetermined first temperature, advantageously a soak temperature, the plug 130 melts, permitting the indicator material 14 to move through the capillary tube opening 102 and into the capillary tube 12. As the instrument 20 reaches a predetermined second temperature, which is advantageously a reflow temperature (about 183° C.), the indicator material 14 quickly solidifies. At the end of the heating cycle, the instrument 20 is cooled to, for instance, room temperature.

FIG. 3 is a cutaway side view of an instrument 20 according to the present invention after heating to a temperature equal to or in excess of a second predetermined temperature, such as a solder reflow temperature. The plug 130 has melted, and indicator material 14 has moved into the capillary tube 12 by capillary action. The indicator material 14 has solidified, forming meniscus 114 at the front of indicator material 14 in capillary tube 12. The distance between the opening 112 of capillary tube 12 and the meniscus 114 of indicator 14 is indicator length L2. The indicator length L2 is typically read with reference to the graduated length indicia 102. The indicator length L2 is proportional to the duration of heating of instrument 20 to temperatures intermediate between a first predetermined temperature and a second predetermined temperature.

As the rate of motion of indicator material 14 in capillary tube 12 is dependent on a number of factors, including bore b of the capillary tube 12, the viscosity of indicator material 14, etc., the graduated length indicia 102 are advantageously calibrated empirically. In a typical case, multiple identical instruments 20 according to the present invention are subjected to heating at temperatures intermediate between predetermined first and second temperatures for known lengths of time. These times are recorded and are compared to the indicator lengths L2 for the corresponding instruments 20. A calibration curve is then prepared using the time-length data points by known methods, such as linear regression, log linear regression, log log regression, etc. This calibration curve is used to position length indicia 102 on instruments 20 according to the present invention, at convenient time intervals in convenient time units.

FIG. 4 depicts a side view of the instrument 20 as depicted in FIG. 3. The capillary tube 12 is visible through an aperture 18 in housing body 16. The housing body 16 has numerical indicia 122 beneath aperture 18. The numerical indicia 122 align with graduated length indicia 102, and are calibrated to indicate the duration of heating to temperatures intermediate between predetermined first and second temperatures in convenient time units. The aperture 18 is advantageously open space, however it may contain a window (not shown) made from any suitable material, such as glass or transparent polymer. A glass window is advantageously made from a temperature resistant material such as borosilicate glass, although other materials may be used.

The indicator material 14 may be any material that is liquid at temperatures below a predetermined second temperature, such as a solder reflow temperature, and is solid at temperatures above a predetermined second temperature. Such indicator materials include thermosetting polymers known as snap-cure polymers. Snap-cure polymers include epoxy, polyimide, bismaleimide and mixtures of bismalemides and vinyl ethers. Particularly advantageous snap-cure polymers are epoxy polymers that solidify in periods of less than a minute, preferably less than one second, at a predetermined second temperature such as a solder reflow temperature. Such polymers are known in the art. Another advantageous snap-cure composition is represented by a bismalemide-vinyl ether composition marketed under the brand name ABLEBOND 967-3, by the Ablestik Electronic Materials and Adhesives Company of Rancho Dominguez, Calif. Other snap-cure compositions are available and are contemplated as being useful in an instrument according to the present invention.

The capillary tube 12 is advantageously a borosilicate glass tube, however other materials may be used according to the present invention. The capillary tube 12 is of any useful length, depending on the anticipated duration of the instrument 20 between predetermined first and second temperatures and the viscosity of the indicator material 14. However, the length of capillary tube 12 is advantageously from 0.5–10 cm, and even more advantageously from 1–2 cm.

The reservoir 104 is, in certain embodiments according to the present invention, integrally formed with the capillary tube 12. In such embodiments, the capillary tube 12 and reservoir 104 are formed by typical glass forming methods, such as glass blowing. When the reservoir 104 and capillary tube 12 have been formed, the capillary tube 12 is left open at end 124.

The graduated length indicia 18 are advantageously from 0.005 to 0.5 cm, apart. At the lower end of the scale, e.g. from 0.005 to 0.05 cm, however, the capillary tube 12 should be viewed through the aperture 112 with a magnifying device (not shown.) For simplicity of operation, graduated length indicia 18 are spaced about 0.1 cm apart, however other spacings are possible and are envisaged as being within the scope of the present invention. The spacing of graduated length indicia 18 are predetermined and are precisely known, however, in order to permit accurate and precise measurement of duration of the period between predetermined first and second temperatures. As mentioned above, the capillary tube 12 should be made from a material, such as borosilicate glass, whose length and volume does not change appreciably with change in temperature. This will ensure that the distance between length indicia 18 will remain nearly constant with temperature, thereby ensuring accurate operation of the instrument through a range of temperatures.

The inner diameter, or bore, of the capillary tube 12 may be any value so long as the indicator material 14 may flow by capillary action through the capillary tube after the plug 130 has been removed. In general, it is advantageous to use a combination of indicator material 14 having a particular viscosity and a capillary tube bore that permit the meniscus 114 of the indicator material 14 to move no farther than the full length of the capillary tube 12 in the maximum time available for heating of the instrument. For instance, if the instrument will be heated for a maximum of 20 minutes, the viscosity of the indicator material 14 and the bore b of the capillary tube 12 should be matched so that the meniscus 114 will be located approximately just short of the end 122 of capillary tube 12, advantageously approximately at the last graduation indicia 18 before the end 122 of the capillary tube 12.

The bore b of capillary tube 12 is advantageously substantially constant throughout its length from opening 112 to end 122.

The plug 130 is made of a material that is solid and impervious to the indicator material 14 up to the predetermined first temperature, but which melts at the predetermined first temperature, thereby allowing the indicator material 14 to enter the capillary tube 12 through the opening 112. The plug 130 may advantageously be made of a polymer, a wax or a mineral grease. Advantageously the plug 130 comprises one or more wax or polymer that has a very sharp melting point, for example a melting range of less than 1° C. If the indicator material 14 is particularly viscous, or if the meniscus 114 otherwise moves very slowly through the capillary tube 12 by capillary action, the plug 130 may be made from a wax or polymer having a broader melting range, for example about 3° C.

Advantageously the plug 130 is as thin as practical for keeping the indicator material 14 from moving into capillary tube 12 by capillary action at temperatures below the predetermined first temperature. A range of useful thickness for a plug 130 is 0.001–0.1 cm. The thinner the plug 130 can be made, the shorter will be the amount of time that it takes to melt. The skilled artisan will thus choose the thinnest plug 130 that will maintain indicator material 14 outside of the capillary tube 12 at temperatures below the predetermined first temperature.

The predetermined second temperature is advantageously a solder reflow temperature. As an example, lead-tin solder has a solder reflow temperature of about 183° C. Therefore, an exemplary predetermined second temperature is 183° C. Other types of solder, such as high-melting solders, have different solder reflow temperatures. The skilled artisan will thus choose an indicator material 14 that will solidify, for instance snap cure, at a temperature that is appropriate for the particular application envisaged. An exemplary range of temperatures useful for the predetermined second temperature is for instance 180–220° C., although other predetermined second temperatures may be chosen depending on the particular needs of the manufacturing process.

The predetermined first temperature is advantageously any temperature of interest that is above room temperature but below the predetermined second temperature. Advantageously, the predetermined first temperature is sufficiently higher than room temperature that the instrument 10 will be capable of being transported under less-than-ideal conditions, for instance elevated temperatures, without compromising the usefulness of the instrument. Therefore, the predetermined first temperature is advantageously in the range of 100–182° C. An exemplary range of temperatures useful for a predetermined first temperature is 10–40° C. below the predetermined second temperature. A typical predetermined first temperature is a soak temperature, at which an integrated circuit package is held to allow all the components of the package to equilibrate before elevating the temperature above the second predetermined temperature, which, in exemplary embodiments of the present invention, is a solder reflow temperature.

In an integrated circuit manufacturing process, a particularly advantageous first temperature is a soak temperature— that is a temperature at which the instrument will be held for a period of time until integrated circuit components have achieved the same temperature, which is lower than a solder reflow temperature. Exemplary soak temperatures are, for instance, 5–20° C. below the solder reflow temperature. In some embodiments according to the present invention, the predetermined first temperature is a soak temperature that is 5–8° C. below the predetermined second temperature, which is a solder reflow temperature.

The housing body 16 is advantageously made from any material that is both cost-effective and resistant to temperatures above the predetermined second temperature. Suitable metals include brushed aluminum, stainless steel, and brass. Suitable polymers include polymers that are resistant to high temperatures. Suitable ceramics include silca-based ceramics manufactured by sintering processes. Sintered metal bodies are also advantageously employed as materials for making housing body 16. Advantageously, the housing body 16 is made of a material that is resistant to temperatures substantially higher than the predetermined second temperature. In certain embodiments according to the present invention, the housing body 16 is resistant to temperatures that are 20–100° C. above the predetermined second temperature. In other embodiments, the housing body 16 is resistant to temperatures 30–50° C. about the predetermined second temperature. Advantageous materials for making disposable housing bodies 16 are blow-molded polymers, which are stable to temperatures from 200–300° C.

In certain embodiments, the reservoir 104 is integral with the housing body 16. In other embodiments, the reservoir 104 may be separately constructed of a material that is inert to the indicator material 14. Other embodiments are also contemplated as being within the scope of the present invention, and are chosen with a mind toward considerations such as cost, manufacturing efficiency, and inertness to the chosen indicator material.

The reservoir 104 may be of any suitable shape. In some embodiments according to the present invention the reservoir 104 is cubical. In other embodiments it is frusto-conical, spherical or oblate-spheriodal. The ordinary artisan chooses the shape of reservoir 104 based on its manufacturing convenience, etc. These shapes are achieved by any means common in the glass body manufacturing, such as glass-blowing.

Accordingly, a suitable method of manufacturing an instrument 10 according to the present invention is as follows. First, the reservoir 104 and the capillary tube 12 are formed by known glass-blowing methods, however the capillary tube is left open at end 124. Next, a micro needle is placed through capillary tube 12 so that its tip is within reservoir 104 and injects just enough indicator material 14, such as a snap-cure epoxide polymer, to fill reservoir 104.

This micro needle is removed. Then a second micro needle is inserted into capillary tube 12. This second micro needle injects a suitable plug material 130, such as a wax or polymer material, into tube 12 so that it blocks opening 112 and prevents indicator material 14 from moving into the capillary tube 12 through opening 112. The second micro needle is then removed and the capillary tube 12 is closed, for example by plugging end 124 or by heating end 124 with a suitable heating device, such as by fusing end 124 with a flame. The product of the foregoing manufacturing process is an instrument 10 according to the present invention.

Figure 5:
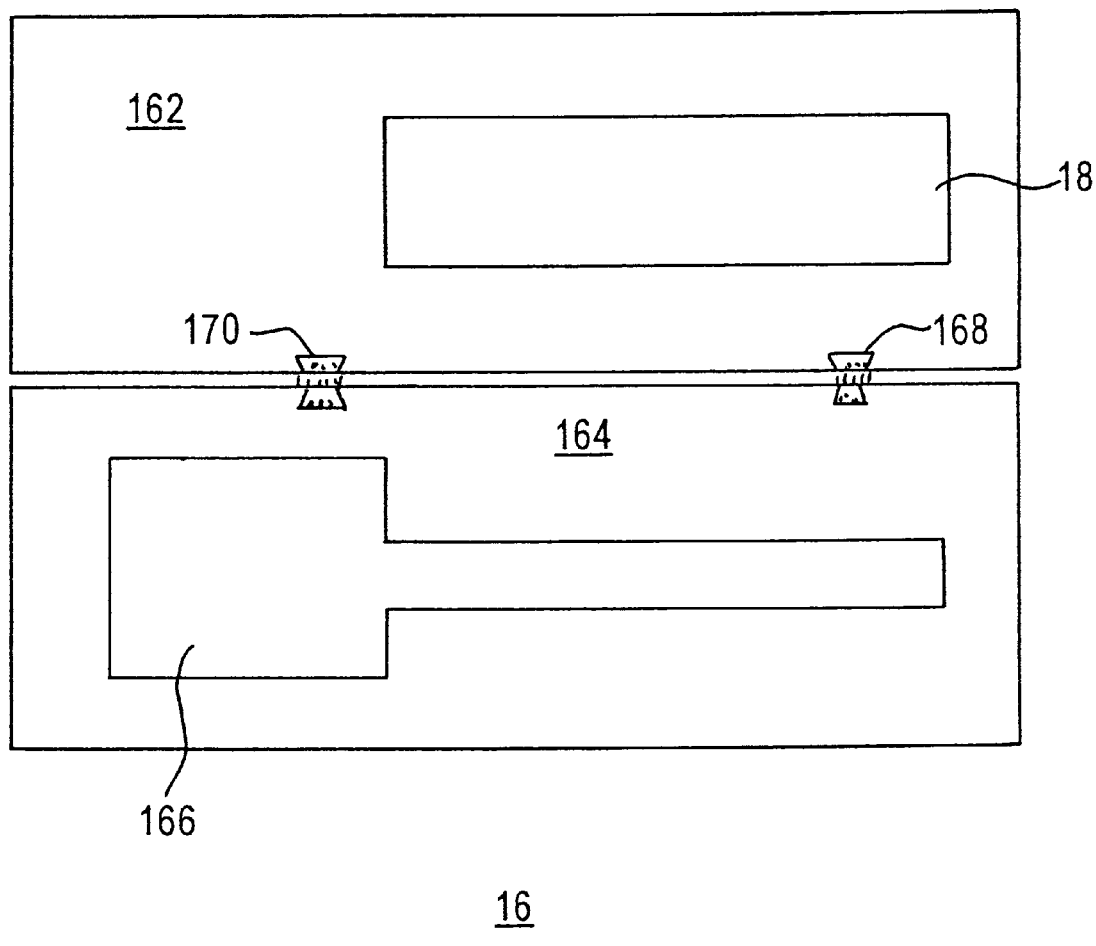
FIG. 5 is a top view of a housing body for holding an instrument according to the present invention.

FIG. 5 depicts a top view of the inside of an embodiment of a housing body 16 according to the present invention. The housing body 16 comprises a top part 162 and a bottom part 164. The top part 162 has an aperture 18, while bottom part 164 has an indentation 166 for receiving a capillary tube/reservoir assembly, such as instrument 10 as shown in FIG. 1. The top part 162 and bottom part 164 are held together by hinges 168, 170, which allow the housing body 16 to be closed.

An instrument according to the present invention having a housing body is advantageously manufactured by combining an instrument 10 as depicted in FIG. 1 with a housing body 16 as depicted in FIG. 5 to form an instrument 20 as depicted in FIG. 4. The housing body 16 is provided in an open position, the instrument 10 is placed within the indentation 166 of the housing body 16, and the housing body 16 is closed by pivoting top part 162 and bottom part 164 relatively toward one another about hinges 168, 170.

Figure 6:
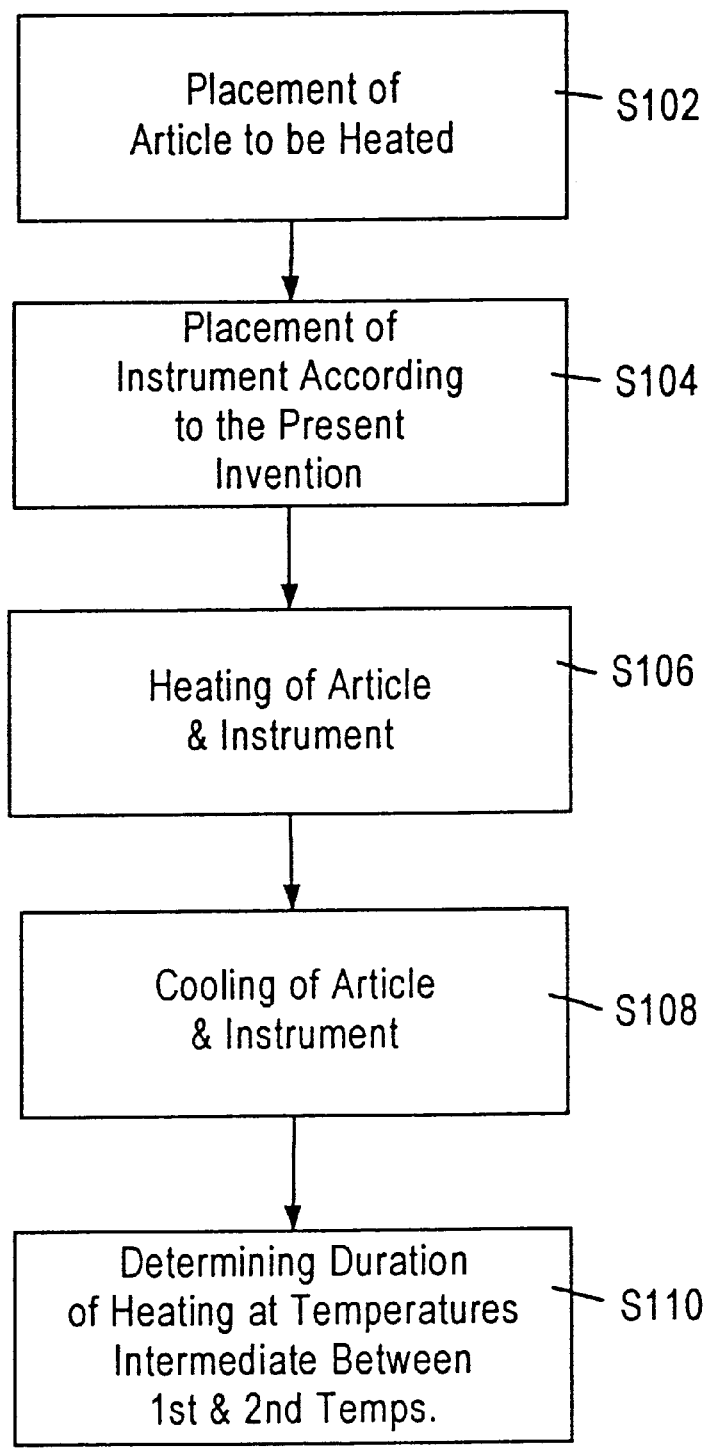
FIG. 6 is a block diagram depicting the steps in a method according to the present invention.

FIG. 6 is a block diagram depicting an embodiment of the method according to the present invention. Advantageously, a reflow oven may comprise a conveyor, on which is situated a boat. The integrated circuit package assembly and the instrument according to the present invention are placed together in the boat, and the boat is moved by the conveyor into the oven.

In S102, an article to be heated, such as an integrated circuit package assembly to be reflowed, is provided by, for instance, placing it in a boat on a conveyor belonging to a conveyor-type reflow oven. In S104, an instrument according to the present invention is placed in proximity to the article to be heated, for instance on the boat with the article to be heated.

In S106, the article to be heated and the instrument according to the present invention are heated, for instance in the aforementioned reflow oven, first to a predetermined first temperature and then to a predetermined second temperature, such as a solder reflow temperature. As the instrument according to the present invention is heated, it first attains a predetermined first temperature at which the plug melts, permitting the indicator material to move into the capillary tube by capillary action. When the instrument attains a predetermined second temperature, such as a reflow temperature, the indicator material solidifies, for example snap cures.

After the instrument according to the present invention is heated, it is permitted to cool to room temperature in step S108.

In S110, the duration of heating at temperatures intermediate between the first and second temperatures is determined from the amount of indicator material that has moved into the capillary tube by capillary action is measured.

The amount of indicator material that has moved into the capillary tube by capillary action is advantageously determined by viewing a meniscus of the indicator material. Such viewing of the meniscus of the indicator material may be accomplished manually, by an operator or technician, or, in the case of large runs, automatically by machine vision. In other embodiments, however, the amount of material in the capillary tube is measured gravimetrically by removing a capillary tube and indicator material that have been subject to the process steps S102–S108, obtaining the mass of the capillary tube and its indicator material contents, and comparing this mass to the mass of a standard capillary tube without indicator material contents. The amount of indicator material in the capillary tube is then compared to a calibration curve as described above, again either manually or by a computer, to give the duration at temperatures intermediate between the first and second predetermined temperatures.

Measuring of the mass of capillary tubes containing indicator material is accomplished either manually or automatically. Furthermore, use of mass of capillary tubes and indicator material to measure the amount of indicator material in the capillary tube requires the use of extremely accurate and precise microbalances, and the avoidance of contamination. Accordingly, for all but the most precise applications, visual determination of duration at temperatures intermediate between first and second predetermined temperatures is adequate. Other equivalent embodiments for measuring the amount of indicator material in the capillary tube after heating to a second predetermined temperature are envisaged as being within the scope of the present invention.

In certain embodiments of the present invention, the instrument is heated in a reflow oven, such as a conventional reflow oven or a zone heating reflow oven. Heating elements of suitable reflow ovens include resistive heating elements and, microwave heating elements. Other embodiments are possible, and the particular type of heating apparatus is not critical to the present invention.

The present invention provides an instrument capable of accurately and precisely measuring the amount of time that the instrument spends between a predetermined first temperature and a predetermined second temperature. In certain embodiments of the invention, the instrument allows, for instance, for accurate and precise measurement of time that an integrated circuit assembly spends at temperatures between an equilibration temperature and a reflow temperature, which is higher than the equilibration temperature. Using an instrument according to the present invention, it is possible to accurately and precisely measure duration of heating at temperatures intermediate between predetermined first and second temperatures, thereby gaining valuable empirical data regarding the amount of time necessary for various parts to reach equilibrium temperatures, the rate of temperature increase between the predetermined first and second temperatures given the particular integrated circuit components, oven temperatures, and other heating conditions such as zone heating. Thus, the instrument and method of the present invention allow an integrated circuit manufacturer to develop more exacting and cost-effective processes for manufacturing packaged integrated circuits.

Other applications for an instrument according to the present invention are practical and are envisaged within the scope of the present invention. In general, an instrument according to the present invention is useful wherever it is desired to measure a duration of temperatures above a predetermined temperature. For instance, instruments according to the present invention find applications within polymer heat curing, coating and baking arts. Other applications of instruments according to the present invention are apparent to those working in those arts.

While this invention has been described in connection with what is presently considered to be the most practical and preferred embodiments, it is to be understood that the invention is not limited to the disclosed embodiments, but, on the contrary, is intended to cover various modifications and equivalent arrangements included within the scope of the appended claims.

What is claimed is:

1. An instrument for measuring and indicating duration of exposure to temperatures intermediate between a first predetermined temperature and a second predetermined temperature, wherein said second temperature is greater than said first temperature, comprising:

a capillary tube;

an indicator material; and a plug;

the capillary tube having a tube opening;

the indicator material being located outside the capillary tube and adjacent and in contact with the tube opening and being in a liquid state at temperatures between the first temperature and second temperature, and undergoing a transition to a solid state at the second temperature;

the plug being located within the capillary tube and adjacent the tube opening, and comprising a material having a melting point temperature equal to the first temperature.

2. The instrument of claim 1, wherein the capillary tube is a glass tube.

3. The instrument of claim 1, wherein the indicator material is a polymer composition.

4. The instrument of claim 3, wherein the polymer composition is a thermo-setting composition.

5. The instrument of claim 4, wherein the thermo-setting composition is a snap-curing composition.

6. The instrument of claim 1, wherein the plug is a wax plug.

7. The instrument of claim 1, further comprising a housing encasing the capillary tube, indicator material and plug.

8. The instrument of claim 7, wherein the housing has a transparent sight glass.

9. The instrument of claim 7, wherein the housing has an aperture.

10. The instrument of claim 1, wherein the capillary tube has an outer surface spaced graduated length indicia.

11. A method of measuring and indicating duration of exposure to temperatures intermediate between a first predetermined temperature and a second predetermined temperature, wherein said second temperature is greater than said first temperature, comprising:

providing an instrument having:

a capillary tube;

an indicator material; and a plug;

the capillary tube having a tube opening;

the indicator material being located outside the capillary tube and adjacent and in contact with the tube opening and being in a liquid state at temperatures between the first temperature and second temperature, and undergoing a transition to a solid state at the second temperature;

the plug being located within the capillary tube and adjacent the tube opening, and comprising a material having a melting point temperature equal to the first temperature heating the instrument;

cooling the instrument;

determining the amount of the indicator material present in the capillary tube; and calculating the time of duration at temperatures intermediate between the first and second predetermined temperatures from the amount of the indicator material present in the capillary tube.

12. The method of claim 11, wherein the second predetermined temperature is a solder reflow temperature.

13. The method of claim 11, wherein the first predetermined temperature is a soak temperature.

14. The method of claim 11, further comprising placing the instrument in proximity to an integrated circuit package assembly and placing the instrument and the integrated circuit assembly in a reflow oven.

15. The method of claim 11, wherein the amount of indicator material in the capillary tube is determined by:

visually locating a meniscus of the indicator material, and measuring a distance between the capillary tube opening and the meniscus.

16. The method of claim 15, wherein the meniscus is visually located by machine vision.

17. The method of claim 15, wherein the meniscus is visually located by a human operator, with reference to graduated length indicia, numerical indicia, or both.

18. The method of claim 11, wherein the amount of indicator material in the capillary tube is determined gravimetrically.

* * * * *